United States Patent
Kojima et al.

(10) Patent No.: US 7,468,137 B2
(45) Date of Patent: Dec. 23, 2008

(54) WASTEWATER TREATMENT PROCESS

(75) Inventors: Hitoshi Kojima, Minamiashigara (JP); Shinichiro Kawashima, Minamiashigara (JP); Kazuya Mori, Minamiashigara (JP); Atsushi Yamahashi, Minamiashigara (JP); Yuji Masuda, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 291 days.

(21) Appl. No.: 11/267,277

(22) Filed: Nov. 7, 2005

(65) Prior Publication Data
US 2006/0283806 A1    Dec. 21, 2006

(30) Foreign Application Priority Data
Jun. 17, 2005    (JP) .............................. 2005-177361

(51) Int. Cl.
*C02F 1/52* (2006.01)
(52) U.S. Cl. ................. 210/705; 210/724; 210/725; 210/727; 210/917
(58) Field of Classification Search ................ 210/716
See application file for complete search history.

(56) References Cited

U.S. PATENT DOCUMENTS

| | | | | |
|---|---|---|---|---|
| 2,217,466 A | * | 10/1940 | Baylis | 210/723 |
| 5,069,893 A | | 12/1991 | Haase et al. | |
| 5,415,808 A | * | 5/1995 | Hasegawa et al. | 252/181 |
| 5,662,826 A | * | 9/1997 | Nilsson et al. | 252/179 |
| 6,190,561 B1 | * | 2/2001 | Nagan | 210/665 |

FOREIGN PATENT DOCUMENTS

| | | |
|---|---|---|
| JP | 7-136408 A | 5/1995 |
| JP | 9-225474 | 9/1997 |
| JP | A 11-216478 | 8/1999 |

OTHER PUBLICATIONS

Excerpt of the 5th Edition of "Technology and Regulations for Pollution Prevention (Water Resources Edition)", edited by the environmental Protection and Industrial Location Bureau, Ministry of International Trade and Industry, published 2001 (p. 140-153 and 182 & 183) with Partial English Translations.

* cited by examiner

*Primary Examiner*—Peter A. Hruskoci
(74) *Attorney, Agent, or Firm*—Oliff & Berridge, PLC

(57) ABSTRACT

A wastewater treatment process for treating wastewater comprising a water-based dispersion containing a surfactant, a colorant and silica, as well as other solid matter, wherein the wastewater is treated using a polysilicato-iron coagulant.

10 Claims, 2 Drawing Sheets

WASTEWATER TREATMENT PROCESS

BACKGROUND OF THE INVENTION

1. Field of the Invention

The present invention relates to a wastewater treatment process for treating wastewater containing a solid fraction that is discharged during a process for producing electrophotographic toner (electrostatic latent image developing toner) or the like.

2. Description of the Related Art

At production facilities for water-based paints and electrophotographic toners and the like, processes for the production of water-based dispersions generate wastewater that contains dispersed colorants and the like. Because this wastewater contains not only a colorant component containing pigments and the like, but also surfactants that have been used for improving the dispersibility of the pigments, and silica that has been used as an internal additive, both the solid fraction concentration and the chemical oxygen demand (COD) are large, meaning the wastewater is unable to be discharged into rivers or ground water in an untreated state. As a result, this wastewater should first undergo treatment within a wastewater treatment facility inside the production plant, prior to being discharged externally.

In recent years, a variety of chemical toner production methods, including emulsion polymerization methods, suspension polymerization methods, and solution suspension methods have been developed and implemented to replace the more conventional mix-and-grind electrophotographic toner production methods. For example, in an emulsion polymerization method, a resin dispersion formed by emulsion polymerization of a binder resin polymerizable monomer, together with a colorant, a release agent, and if required a charge control agent and the like, are stirred together in a water-based solvent in the presence of a surfactant, and subjected to aggregation, heating, and fusing, thereby preparing toner particles comprising colored resin particles with a predetermined particle size, particle size distribution, shape, and structure. However, during this process, wastewater is generated that contains a significant solid fraction, including aqueous solutions of the surfactant, pigment dispersions, release agent dispersions, aqueous emulsions, silica dispersions, and wastewater from apparatus cleaning operations.

Normally, coagulation-sedimentation treatment is used as the most typical wastewater treatment process. As disclosed on pages 141 to 153 of the 5th edition of "Technology and Regulations for Pollution Prevention (Water Resources Edition)" (edited by the Environmental Protection and Industrial Location Bureau, Ministry of International Trade and Industry, published 2001), coagulation-sedimentation treatment is the most widely used solid-liquid separation operation within the field of wastewater treatment. In a coagulation-sedimentation treatment, a coagulant is added to the wastewater to generate a flock (large, coarse particles generated by aggregation), and the difference in specific gravity between the water and the flock causes the flock to sink as a sediment, thereby achieving a solid-liquid separation. The solid flock that is separated in this manner is treated as an industrial waste sludge, whereas the remaining water, which exhibits a significantly reduced chemical oxygen demand, is discharged into rivers or ground water. The sludge generated by the solid-liquid separation is often subjected to dewatering using a pressure filtration dewatering apparatus. As described on page 182 of the 5th edition of "Technology and Regulations for Pollution Prevention (Water Resources Edition)" (edited by the Environmental Protection and Industrial Location Bureau, Ministry of International Trade and Industry, published 2001), a pressure filtration dewatering apparatus is the most commonly used dewatering system in the field of wastewater treatment.

Japanese Laid-Open Publication No. Hei 7-136408 discloses a wastewater treatment process for conducting a solid-liquid separation of wastewater containing organic contaminants, wherein final treatment of the sludge is simplified by recycling a portion of the generated sludge and returning it to the raw treatment water. Furthermore, Japanese Laid-Open Publication No. Hei 9-225474 discloses a process wherein a pressure flotation separation is used for treating an emulsion wastewater.

However, the solid fraction and chemical oxygen demand of the wastewater generated at an actual toner production plant can vary considerably depending on the nature of the process, and if the process disclosed in Japanese Laid-Open Publication No. Hei 7-136408 is used for treating wastewater with a low solid fraction concentration or low chemical oxygen demand, then because the quantity of the flock formed by addition of the coagulant is minimal, the sludge does not settle readily, meaning the solid fraction concentration or the chemical oxygen demand does not decrease significantly. In those cases where this process is used for treating silica-containing wastewater, the action of the silica causes the sludge to become particularly resistant to sedimentation, although the mechanism for this action is not clear.

Furthermore, although the process disclosed in Japanese Laid-Open Publication No. Hei 9-225474 is suitable for the treatment of emulsion wastewater, it cannot be applied to all the various types of wastewater that are generated in a toner production plant.

Furthermore, the wastewater generated during electrophotographic toner production using a chemical toner production method such as an emulsion polymerization method, suspension polymerization method, or solution suspension method contains surfactants, colorants, release agents, silica, and a variety of other components, and if this wastewater is treated using a coagulation-sedimentation treatment, then the settling characteristics of the flock within the settling tank are poor, and particularly in those cases where the solid fraction concentration or the chemical oxygen demand is low, an extremely long settling time is required to achieve satisfactory solid-liquid separation. In addition, if a large quantity of coagulant is used to effect a satisfactory coagulation-sedimentation treatment of the small quantity of solid matter contained within the wastewater, then the quantity of sludge that should be treated as industrial waste increases significantly.

The present invention is a wastewater treatment process which enables efficient treatment of wastewater containing a solid fraction that is discharged during processes for producing water-based dispersions at production facilities for water-based paints and electrophotographic toners and the like, and also enables reductions in the quantity of coagulant used and the quantity of sludge generated.

SUMMARY OF THE INVENTION

The present invention provides a wastewater treatment process for treating wastewater comprising a water-based dispersion containing a surfactant, a colorant and silica, as well as other solid matter, wherein the wastewater is treated using a polysilicato-iron coagulant.

Furthermore, the present invention also provides a wastewater treatment process for treating wastewater comprising a water-based dispersion containing a surfactant, a colorant and silica, as well as other solid matter, wherein the other solid matter comprises electrostatic latent image developing toner, and the wastewater is treated using a polysilicato-iron coagulant.

According to the present invention, by using a polysilicato-iron coagulant in the treatment of wastewater containing a solid fraction that is discharged during a process for producing a water-based dispersion comprising a surfactant, a colorant and silica at a production facility for water-based paints or electrophotographic toners and the like, the treatment can be conducted efficiently, and the quantity of coagulant used and the quantity of sludge generated can be reduced.

BRIEF DESCRIPTION OF THE DRAWINGS

A preferred embodiment of the present invention will be described in detail based on the following figures, wherein.

DETAILED DESCRIPTION OF THE INVENTION

Figure 1:
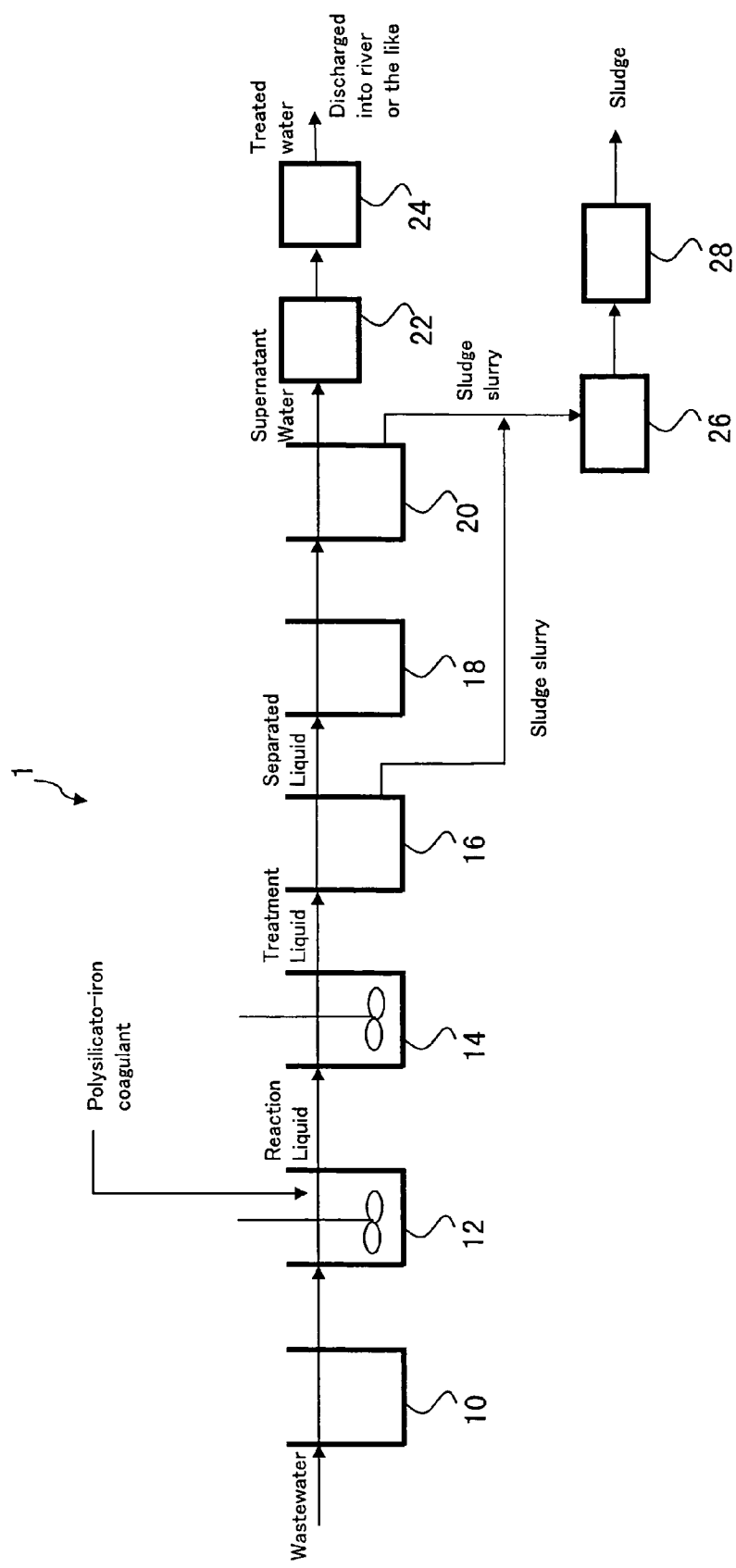
FIG. 1 is a schematic illustration showing one example of a wastewater treatment apparatus according to an embodiment of the present invention.

As follows is a description of an embodiment of the present invention. In this description, a wastewater treatment process according to the embodiment is described using the production process for an electrophotographic toner as an example.

As a result of investigations by the inventors of the present invention, it was discovered that in a waste liquid discharged from a toner production process, such as an aqueous solution of a surfactant, or a pigment dispersion, release agent dispersion, aqueous emulsion or silica dispersion, if wastewater with a low solid fraction concentration, for example, wastewater containing an aqueous solution of a surfactant, is mixed with wastewater with a high solid fraction concentration, so that the low concentration wastewater accounts for about 30 to about 70% by weight of the total weight of wastewater, then the action of the surfactant causes a lengthening of the settling time required during coagulation-sedimentation treatment, and an increase in the quantity of inorganic coagulant such as ferric chloride or the like that should be added to achieve satisfactory coagulation-sedimentation. As a result, the quantity of sediment, namely, the quantity of sludge that should be treated as industrial waste, increases considerably. It is thought that this observation is a result of a portion of the inorganic salt such as ferric chloride, which is added as the inorganic coagulant, undergoing a charge neutralization reaction with the surfactant contained within the wastewater, thereby inhibiting the coagulation effect of the salt. Furthermore, even when coagulation-sedimentation treatment is conducted on wastewater with a low solid fraction concentration, a certain quantity of coagulant is always required, and because the wastewater with the low solid fraction concentration accounts for about 30 to about 70% by weight of the total weight of wastewater, a large quantity of coagulant should still be used.

As a result of further intensive research, the inventors of the present invention discovered that in the treatment of wastewater containing a solid fraction that is discharged during a toner production process or the like, by employing a treatment process that uses a polysilicato-iron coagulant, aggregation treatment can be conducted efficiently, enabling the quantity of coagulant used and the quantity of sludge generated to be reduced. The mechanism for this observation remains unclear, although it is believed that bonding between the silica within the wastewater and the silica of the coagulant enables a satisfactory aggregation effect to manifest even with small quantities of the coagulant.

<Wastewater Treatment Process>

In a wastewater treatment process according to the embodiment of the present invention, at least one of a coagulation-sedimentation treatment and a pressure flotation treatment is conducted using a polysilicato-iron coagulant. Following completion of the wastewater treatment, the treated wastewater is discharged into a river or the like. In order to enable discharge into a river or the like, the chemical oxygen demand should be no more than about 20 mg/L, and tests confirm that the wastewater generated from a toner production process or the like should undergo a significant reduction in the chemical oxygen demand of the wastewater, using a solid-liquid separation such as coagulation-sedimentation treatment, prior to being discharged.

In the case of coagulation-sedimentation treatment, a polysilicato-iron coagulant is added to the wastewater as a coagulant. A specific example of a coagulation-sedimentation treatment is described below with reference to the drawings, although the present invention is in no way limited by this example.

FIG. 1 shows a schematic illustration of one example of a wastewater treatment apparatus for conducting wastewater treatment according to the embodiment of the present invention.

As shown in FIG. 1, the wastewater treatment apparatus 1 that represents this example of a wastewater treatment apparatus according to the present embodiment comprises an untreated water tank 10, a reaction tank 12, a coagulation tank 14, a coagulation-sedimentation tank 16, a biological treatment tank 18, a secondary sedimentation tank 20, a sand filtration device 22, an activated carbon filtration-adsorption device 24, a sludge concentration tank 26, and a dewatering device 28.

In the wastewater treatment apparatus 1, the respective inlets and outlets of the untreated water tank 10, the reaction tank 12, the coagulation tank 14, the coagulation-sedimentation tank 16, the biological treatment tank 18, the secondary sedimentation tank 20, the sand filtration device 22, and the activated carbon filtration-adsorption device 24 are connected in a series arrangement via piping or the like. Furthermore, the inlet of the sludge concentration tank 26 is connected via piping or the like to an outlet in the bottom of the secondary sedimentation tank 20. And the inlet of the dewatering device 28 is connected via piping or the like to an outlet of the sludge concentration tank 26.

The wastewater treatment process according to the present embodiment is described below with reference to FIG. 1.

Wastewater discharged from a toner production process is first subjected to a coagulation-sedimentation treatment. This coagulation-sedimentation treatment comprises a reaction step of adding a coagulant to the wastewater in the reaction tank 12 to effect a coagulation reaction, a flock formation step of forming a flock in the coagulation tank 14 from the aggregated material generated by the coagulation reaction of the reaction step, and a separation step of separating the flock and the separated liquid in the coagulation-sedimentation tank 16.

The wastewater is initially stored temporarily in the untreated water tank 10, and is then transferred to the reaction tank 12, where the coagulant is added using a pump or the like, while the wastewater is stirred rapidly using a stirring device such as a stirring blade, thereby effecting the coagulation reaction (the reaction step). Subsequently, the reaction liquid from the coagulation reaction is transferred to the coagulation tank 14.

A polysilicato-iron coagulant is used as the coagulant in the reaction step. The quantity added of the polysilicato-iron coagulant is preferably equivalent to a concentration within a range from about 1 mg/L to about 500 mg/L, and even more preferably from about 1 mg/L to about 100 mg/L, relative to the quantity of wastewater being treated. If the quantity is less than about 1 mg/L, the coagulation effect is minimal, and the water content of the sludge can become overly high, whereas if the quantity exceeds about 500 mg/L, the quantity of sludge generated increases, which can make separation more difficult in the following steps.

Furthermore, in those cases where the quantity of the surfactant within the wastewater is within a range from about 0.1 to about 4% by weight relative to the weight of the wastewater, and the quantity of silica within the wastewater is also within a range from about 0.1 to about 4% by weight relative to the weight of the wastewater, the use of a polysilicato-iron coagulant produces a particularly superior effect. In cases where the quantity of surfactant is less than about 0.1% by weight and the quantity of silica is also less than about 0.1% by weight, membrane separation techniques are more suitable. In this manner, in terms of maximizing the treatment efficiency of the wastewater treatment, the most appropriate wastewater treatment process is preferably selected in accordance with the quantities of surfactant and silica incorporated within the wastewater. Furthermore, in the case of treating wastewater discharged from a production process for a latex polymer (an emulsion dispersion), concentration treatment using centrifugal concentration or the like can be difficult, and in such cases, another wastewater treatment process such as a heated acid decomposition treatment using concentrated sulfuric acid may be used.

In terms of the coagulation effect, the Si/Fe molar ratio within the polysilicato-iron coagulant is preferably within a range from about 0.1 to about 4.0, and even more preferably from about 1.0 to about 3.0.

In terms of the coagulation effect, the pH of the reaction liquid during the coagulation reaction using the polysilicato-iron coagulant is preferably within a range from about 4 to about 9, and even more preferably from about 5 to about 7.

In this reaction step, another coagulant may also be used in combination with the polysilicato-iron coagulant. Examples of other coagulants that can be used include typical inorganic or organic coagulants. Specific examples of suitable inorganic coagulants include aluminum sulfate, ferric chloride, and aluminum polychloride, although in terms of providing a favorable coagulation effect at low cost, the use of ferric chloride is preferred.

Furthermore, specific examples of suitable organic coagulants include anionic polymer coagulants such as polyacrylamide-based coagulants and sodium polyacrylate-based coagulants; cationic polymer coagulants such as polyacrylamide-based coagulants, polyacrylate ester-based coagulants, polymethacrylate ester-based coagulants, polyamine-based coagulants, and polydicyandiamide-based coagulants; nonionic polymer coagulants such as polyacrylamide-based coagulants and polyethylene oxide-based coagulants; and amphoteric polymer coagulants such as dimethylaminoethyl acrylate-based coagulants. In terms of providing a favorable coagulation effect, the use of cationic polymer coagulants and/or amphoteric polymer coagulants is preferred, and the use of polyacrylamide-based cationic polymer coagulants and/or dimethylaminoethyl acrylate-based amphoteric polymer coagulants is particularly desirable. Furthermore, a combination of a polysilicato-iron coagulant with two or more other coagulants selected from the inorganic and organic coagulants listed above may also be used.

In those cases where an inorganic coagulant is also used, the quantity added is preferably equivalent to a concentration within a range from about 500 mg/L to about 5,000 mg/L, and even more preferably from about 1,000 mg/L to about 3,000 mg/L, relative to the quantity of wastewater being treated.

Furthermore, in those cases where an organic coagulant is also used, the quantity added is preferably equivalent to a concentration within a range from about 1 mg/L to about 500 mg/L, and even-more preferably from about 5 mg/L to about 300 mg/L, relative to the quantity of wastewater being treated.

In the reaction step, the coagulation reaction is conducted by stirring the wastewater rapidly using a stirring device such as a stirring blade. The stirring speed is preferably within a range from about 100 rpm to about 500 rpm. If this stirring speed is lower than about 100 rpm, the coagulation reaction may not proceed satisfactorily, resulting in no reduction in the quantity of particles, whereas if the stirring speed exceeds about 500 rpm, then aggregates that have already formed may actually be broken back down into finer particles.

Subsequently, in the coagulation tank 14, the reaction liquid that has been transferred from the reaction tank 12 is stirred gently using a stirring device such as a stirring blade, thereby forming a flock comprising aggregates of the suspended material within the wastewater (the flock formation step). This flock comprises mainly pigments, release agents, silica, and toner particles. The flock is grown by stirring the wastewater gently. The solid fraction concentration of the flock suspension (treatment liquid) obtained in this manner falls within a range from approximately 0.5 to 1.5%. A single tank that combines the functions of the reaction tank 12 and the coagulation tank 14 may also be used, with the reaction step and the flock formation step both conducted within this single tank.

In the flock formation step, the flock is grown by stirring the wastewater gently with a stirring device such as a stirring blade, and the stirring speed during this step is preferably within a range from about 60 rpm to about 500 rpm, and even more preferably from about 100 rpm to about 300 rpm. If this stirring speed is lower than about 60 rpm, then the flock formation may not proceed satisfactorily, resulting in no reduction in the quantity of particles, whereas if the stirring speed exceeds about 500 rpm, then the flock that has already formed may actually be broken back down into finer particles.

The treatment liquid containing the flock formed in the coagulation tank 14 is then transferred to the coagulation-sedimentation tank 16. In the flock formation step, the wastewater usually flows continuously into the coagulation tank 14, and the treatment liquid containing the formed flock is transferred continuously to the coagulation-sedimentation tank 16. During this process, the residence time within the coagulation tank 14 is preferably within a range from about 5 to about 20 minutes, and even more preferably from about 10 to about 15 minutes. If the residence time is less than about 5 minutes, then the flock formation may not proceed satisfactorily, resulting in no reduction in the quantity of particles, whereas if the residence time exceeds about 20 minutes, the treatment efficiency may deteriorate. Furthermore, the coagulation treatment of the wastewater in the coagulation tank 14 may also be conducted using a batch-type treatment. In such cases, the treatment time is preferably within a range from about 5 to about 15 minutes, and even more preferably from about 5 to about 10 minutes.

The temperature of the wastewater being treated in the coagulation step is typically within a range from about 10° C. to about 30° C., and preferably from about 15° C. to about 25° C.

The treatment liquid that is transferred into the coagulation-sedimentation tank 16 is allowed to separate by natural settling, thereby separating the treatment liquid into a sediment comprising a concentrated flock (a sludge slurry) and a separated liquid. In this separation step, pressure flotation treatment or biological treatment or the like may be conducted instead of the coagulation-sedimentation treatment, but in terms of the quantity of sludge generated, at least one of coagulation-sedimentation treatment and pressure flotation treatment is preferably used. Pressure flotation treatment is a wastewater treatment process that utilizes the fact that when pressurized water is depressurized, air that was dissolved in the water in the pressurized state is released from the water as very fine air bubbles. In this treatment process, pressurized water is introduced into a pressure flotation tank, and the fine air bubbles generated by the depressurization bind to the suspended matter within the wastewater, causing the suspended material to float to the surface for separation.

The liquid that has been separated from the sludge slurry in the coagulation-sedimentation tank 16 is transferred to the biological treatment tank 18, where it is subjected to biological treatment to remove any dissolved organic matter. In the biological treatment tank 18, dissolved organic matter is decomposed by bacteria and the like living in the activated sludge, and in the subsequent secondary sedimentation tank 20, natural settling is used to separate the treatment liquid into an activated sludge and supernatant water. The supernatant water obtained in the secondary sedimentation tank 20 is filtered in the sand filtration device 22 to remove any residual solid matter, is subsequently subjected to adsorption treatment in the activated carbon filtration-adsorption device 24 to adsorb any dissolved chemical substances and any residual dissolved organic matter not treated in the biological treatment step, and is then discharged into a river or the like. Depending on the properties of the wastewater, the biological treatment step may be omitted.

Meanwhile, the sludge slurry that has been separated from the separated liquid in the coagulation-sedimentation tank 16, and the sludge slurry from the secondary sedimentation tank 20 is transported to the sludge concentration tank 26 using a pump or the like, and is concentrated by natural settling over a period of approximately 6 to 12 hours. The solid fraction concentration of the sludge slurry is typically within a range from about 0.5 to about 1.5% by weight, and following concentration, this solid fraction concentration increases to approximately about 2.0 to about 4.0% by weight. The concentrated sludge slurry undergoes dewatering treatment in the dewatering device 28, and is then treated as an industrial waste sludge. The solid fraction concentration of the sludge cake generated following dewatering is typically from about 30 to about 60% by weight. The filtrate generated in the dewatering device 28 is transferred to the untreated water tank 10 used for storing the raw wastewater generated in the toner production process, where it is mixed with fresh, untreated wastewater, and then subjected to the same wastewater treatment process as that described above.

Suitable examples of the dewatering device 28 include pressure filtration devices such as pressure leaf filters and pressure Nutsche filters, as well as filter presses, pressure flotation devices, and vacuum filters, although filter presses are the most commonly used. Furthermore, from the viewpoints of enabling a reduction in the quantity of sludge generated, enabling a shortening of the treatment time, enabling a reduction in the quantity of coagulant used in the coagulation step, and improving the apparatus maintenance, preliminary dewatering may be conducted by centrifugal concentration using a centrifugal separation device, prior to the dewatering step.

Figure 2:
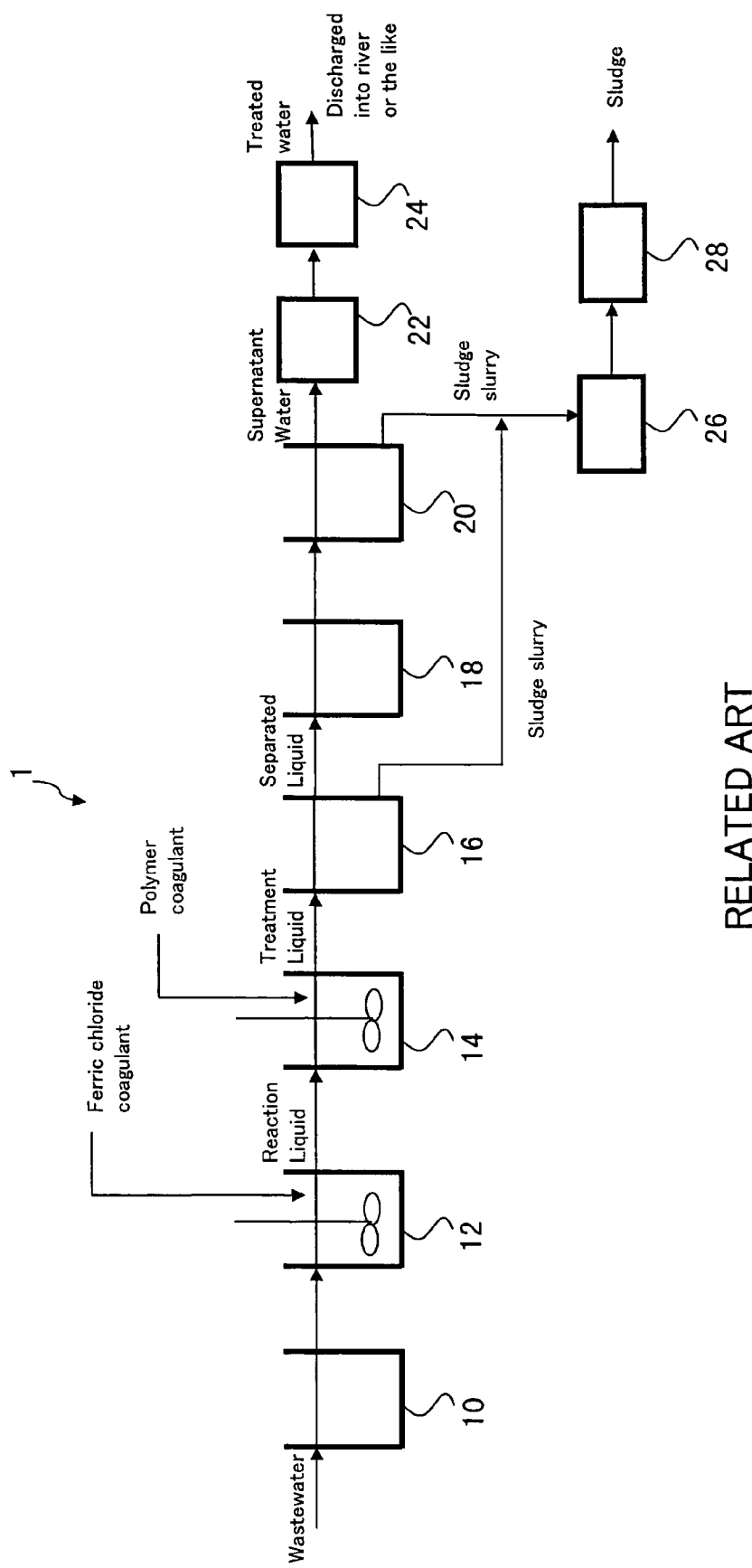
FIG. 2 is a schematic illustration showing a conventional wastewater treatment process.

As shown in FIG. 2, in a conventional wastewater treatment process, the wastewater containing a solid fraction that is discharged from the toner production process is subjected to treatment using ferric chloride coagulant in the reaction tank 12, and is then subjected to further treatment using a polymer coagulant in the coagulation tank 14. The reason that two coagulants are used is that treatment using only the ferric chloride coagulant results in inadequate aggregation, meaning the settling characteristics of the formed flock are poor. Furthermore, the quantities added of each of the coagulants are typically within a range from about 100 mg/L to about 5,000 mg/L for the inorganic coagulant, and within a range from about 1 mg/L to about 100 mg/L for the polymer coagulant, which amounts to a larger quantity of coagulant than that required in the wastewater treatment process according to the embodiment of the present invention. In this type of conventional process, the quantity of coagulant that should be added to achieve satisfactory coagulation-sedimentation increases when the wastewater contains silica, which causes an increase in the quantity of sludge generated. In contrast, in the wastewater treatment process according to the embodiment of the present invention, the quantity of the polysilicato-iron coagulant can be quite small, even if the wastewater contains silica or the like, and additional treatment using a polymer coagulant is unnecessary, meaning the treatment can be conducted efficiently, and both the quantity of coagulant used and the quantity of sludge generated can be reduced.

A wastewater treatment process according to this embodiment of the present invention can be favorably applied to the treatment of wastewater discharged from processes for producing chemical toners by any of a variety of methods including emulsion polymerization methods, suspension polymerization methods, and solution suspension methods, and particularly for emulsion polymerization methods that use large quantities of silica and surfactants. In an emulsion polymerization method, a resin dispersion formed by emulsion polymerization of a binder resin polymerizable monomer, a colorant, a release agent, and if required a charge control agent and the like, are stirred together in a water-based solvent, and subjected to aggregation, heating, and fusing, thereby preparing toner particles comprising colored resin particles with a predetermined particle size, particle size distribution, shape, and structure. Emulsion polymerization methods can be broadly classified into production processes for latex polymers which function as toner raw materials, production processes for dispersions containing colorants, dispersions containing release agents and the like, and production processes for developing toner. As follows is a description of an example of each of these processes.

<Electrophotographic Toner>

[Production Process for Latex Polymer]

In order to produce a latex polymer, a monomer and a surfactant are usually added to water, and the mixture is then stirred to generate an emulsion. Once the monomer emulsion has been formed, no more than about 25% by weight of the monomer emulsion (namely, a small portion of the monomer emulsion) and a free radical initiator are mixed into a water phase, and a seed polymerization is initiated at a predetermined reaction temperature. Following generation of seed particles, the remainder of the monomer emulsion is added to the composition containing the seed particles, and polymerization is continued at a predetermined temperature for a predetermined period of time, thus completing the polymerization and generating a latex polymer (an emulsion dispersion). Various emulsion dispersions and the like containing a solid fraction such as a surfactant are discharged during this latex polymer production process, either having been deemed unnecessary during certain production steps, or having been generated during maintenance of the production facilities. Once a latex polymer has been generated, the polymer is coagulated with a colorant dispersion and a release agent dispersion and the like, thus yielding aggregate particles, and these particles are then fused to generate toner particles.

There are no particular restrictions on the monomer used; provided it is capable of reacting with the free radical initiator, and specific examples of suitable monomers include styrenes such as styrene, para-chlorostyrene and α-methylstyrene; vinyl group-containing esters such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; and vinylnitriles such as acrylonitrile and methacrylonitrile, which are then polymerized to form either homopolymers or copolymers.

Furthermore, a resin such as polyesters or polyurethanes with self-emulsifying properties may also be sheared and dispersed with a surfactant in a water-based medium. A material that contains an ammonia component may also be used as the latex polymer.

Suitable examples of the surfactant used in the production of the latex polymer include anionic surfactants, cationic surfactants, and non-ionic surfactants, although anionic surfactants are usually preferred, as they exhibit powerful dispersion properties and generate superior dispersion of the resin particles. A non-ionic surfactant is preferably combined with either an anionic surfactant or a cationic surfactant. A single surfactant may be used alone, or a combination of two or more different surfactants may be used.

Specific examples of suitable anionic surfactants include fatty acid soaps such as potassium laurate, sodium oleate, and sodium castor oil; sulfate esters such as octyl sulfate, lauryl sulfate, lauryl ether sulfate, and nonyl phenyl ether sulfate; sodium alkyl sulfonates such as sodium lauryl sulfonate, sodium dodecylbenzene sulfonate, sodium triisopropylnaphthalene sulfonate, and sodium dibutylnaphthalene sulfonate; sulfonates such as naphthalene sulfonate formalin condensate, monooctylsulfosuccinate, dioctylsulfosuccinate, lauric amide sulfonate, and oleic amide sulfonate; phosphate esters such as lauryl phosphate, isopropyl phosphate, and nonyl phenyl ether phosphate; dialkylsulfosuccinates such as sodium dioctylsulfosuccinate; and sulfosuccinates such as disodium lauryl sulfosuccinate.

Specific examples of suitable cationic surfactants include amine salts such as laurylamine hydrochloride, stearylamine hydrochloride, oleylamine acetate, stearylamine acetate, and stearylaminopropylamine acetate; and quaternary ammonium salts such as lauryl trimethyl ammonium chloride, dilauryl dimethyl ammonium chloride, distearyl dimethyl ammonium chloride, lauryl dihydroxyethyl methyl ammonium chloride, oleyl bispolyoxyethylene methyl ammonium chloride, lauroyl aminopropyl dimethyl ethyl ammonium ethosulfate, lauroyl aminopropyl dimethyl hydroxyethyl ammonium perchlorate, alkylbenzene trimethyl ammonium chloride, and alkyl trimethyl ammonium chloride.

Specific examples of suitable non-ionic surfactants include alkyl ethers such as polyoxyethylene octyl ether, polyoxyethylene lauryl ether, polyoxyethylene stearyl ether, and polyoxyethylene oleyl ether; alkyl phenyl ethers such as polyoxyethylene octylphenyl ether, and polyoxyethylene nonylphenyl ether; alkyl esters such as polyoxyethylene laurate, polyoxyethylene stearate, and polyoxyethylene oleate; alkylamines such as polyoxyethylene laurylamino ether, polyoxyethylene stearylamino ether, polyoxyethylene oleylamino ether, polyoxyethylene soybean amino ether, and polyoxyethylene beef tallow amino ether; alkylamides such as polyoxyethylene lauric amide, polyoxyethylene stearic amide, and polyoxyethylene oleic amide; vegetable oil ethers such as polyoxyethylene castor oil ether, and polyoxyethylene rapeseed oil ether; alkanolamides such as lauric acid diethanolamide, stearic acid diethanolamide, and oleic acid diethanolamide; and sorbitan ester ethers such as polyoxyethylene sorbitan monolaurate, polyoxyethylene sorbitan monopalmitate, polyoxyethylene sorbitan monostearate, and polyoxyethylene sorbitan monooleate.

There are no particular restrictions on the free radical initiator. Specific examples of suitable initiators include peroxides such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium peroxide, sodium peroxide, potassium peroxide, diisopropyl peroxycarbonate, tetralin hydroperoxide, 1-phenyl-2-methylpropyl-1-hydroperoxide, tert-butyl pertriphenylacetate hydroperoxide, tert-butyl performate, tert-butyl peracetate, tert-butyl perbenzoate, tert-butyl perphenylacetate, tert-butyl permethoxyacetate, and tert-butyl per-N-(3-toluyl)carbamate; azo compounds such as 2,2'-azobispropane, 2,2'-dichloro-2,2'-azobispropane, 1,1'-azo(methylethyl)diacetate, 2,2'-azobis(2-diaminopropane) hydrochloride, 2,2'-azobis(2-diaminopropane)nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1,1'-azobis-1,2-diphenylethane, poly(bisphenol A-4,4'-azobis-4-cyanopentanoate), and poly(tetraethylene glycol-2,2'-azobisisobutyrate); as well as 1,4-bis(pentaethylene)-2-tetrazene and 1,4-dimethoxycarbonyl-1,4-diphenyl-2-tetrazene.

In this embodiment, the size of the latex polymer refers to the volume average particle size measured using a laser diffraction type particle size distribution analyzer (Microtrac, manufactured by NIKKISO Co., Ltd.), and is typically within a range from about 0.05 to about 1 μm.

[Production Process for Colorant Dispersion, Release Agent Dispersion]

A colorant dispersion is obtained by mixing a colorant and a surfactant and the like into a water phase, and then conducting a dispersion treatment. Similarly, a release agent dispersion is obtained by mixing a release agent and a surfactant and the like into a water phase, and then conducting a dispersion treatment. Various colorant dispersions containing a solid fraction that includes the surfactant and the colorant and the like, or release agent dispersions containing a solid fraction that includes the surfactant and the release agent and the like, are discharged during the colorant dispersion or release agent dispersion production process, either having been deemed unnecessary during certain production steps, or having been generated during maintenance of the production facilities.

Examples of suitable colorants include pigments such as carbon black, chrome yellow, Hansa Yellow, Benzidine Yellow, Threne Yellow, Quinoline Yellow, Permanent Orange GTR, Pyrazolone Orange, Vulkan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Rose Bengal, Aniline Blue, Ultramarine Blue, Calco Oil Blue, Methylene Blue Chloride, Phthalocyanine Blue, Phthalocyanine Green and Malachite Green Oxalate; and dyes such as acridine dyes, xanthene dyes, azo dyes, benzoquinone dyes, azine dyes, anthraquinone dyes, dioxazine dyes, thiazine dyes, azomethine dyes, indigo dyes, thioindigo dyes, phthalocyanine dyes, aniline black dyes, polymethine dyes, triphenylmethane dyes, diphenylmethane dyes, and thiazole dyes. These colorants may be used either alone, or in combinations of two or more different colorants.

Furthermore, the size of the colorant within the colorant dispersion refers, for example, to the volume average particle size measured using a laser diffraction type particle size distribution analyzer (Microtrac, manufactured by NIKKISO Co., Ltd.), and is typically within a range from about 0.05 µm to about 0.5 µm.

There are no particular restrictions on the wax that functions as the release agent, and examples of suitable materials include low molecular weight polyolefins such as polyethylene, polypropylene, and polybutene; silicones that exhibit a softening point; fatty acid amides such as oleic amide, erucic amide, ricinoleic amide, and stearic amide; vegetable waxes such as carnauba wax, rice wax, candelilla wax, Japan wax, and jojoba oil; animal waxes such as beeswax; mineral or petroleum waxes such as montan wax, ozokerite, ceresin, paraffin wax, microcrystalline wax, and Fischer-Tropsch wax; and ester waxes of a higher fatty acid and a higher alcohol, such as stearyl stearate and behenyl behenate.

Furthermore, the size of the release agent within the release agent dispersion refers, for example, to the volume average particle size measured using a laser diffraction type particle size distribution analyzer (Microtrac, manufactured by NIKKISO Co., Ltd.), and is typically within a range from about 0.05 µm to about 0.5 µm.

Suitable surfactants include the same surfactants as those described above for use in the production of latex polymers.

[Production Process for Developing Toner]

A latex polymer produced in the manner described above can be used for preparing a toner using a process described below. The latex polymer produced in the manner described above, a colorant dispersion, a release agent dispersion, and where required, a coagulant, a charge control agent and any other required additives are mixed together, and the resulting mixture is heated at a temperature near the glass transition temperature (Tg) of the latex polymer, and preferably at a temperature within about ±10° C. of the Tg value for the latex polymer, for a period of time that is effective in generating an aggregate, typically a period of about 1 to about 8 hours, thereby forming large aggregates of toner. Subsequently, the suspension containing these aggregates is heated at a temperature either equal to or higher than the Tg value for the latex polymer, and preferably at a temperature equivalent to Tg+40° C., typically a temperature of approximately 60 to 120° C., thereby integrating and fusing aggregates to form toner particles. These toner particles are then separated from the mother liquid by filtration or the like, washed with ion exchange water or the like (the washing step), and then dried.

A latex polymer is normally used as the toner binder resin, and typically accounts for about 75 to about 98% by weight of the toner solid fraction.

The quantity of colorant within the toner should be sufficient to generate effective coloring, and is typically within a range from about 1 to about 15% by weight, and preferably from about 3 to about 10% by weight, of the toner solid fraction.

The quantity of the wax that functions as a release agent is preferably within a range from about 5 to about 20% by weight of the toner solid fraction.

The quantity of the optional coagulant, which is used as required, should be a quantity that is effective for the fusion process, and is typically within a range from about 0.01 to about 10% by weight of the toner solid fraction. The coagulant used is preferably a compound with a monovalent or higher charge, and specific examples of suitable compounds include the anionic surfactants listed above; acids such as hydrochloric acid, sulfuric acid, nitric acid, acetic acid, and oxalic acid; and salts such as magnesium chloride, sodium chloride, aluminum sulfate, calcium sulfate, ammonium sulfate, aluminum nitrate, silver nitrate, copper sulfate, sodium carbonate, and aluminum polychloride, although the present invention is not restricted to these coagulants. Coagulants with a nitrogen component, such as nitric acid, are particularly desirable.

The quantity of the optional charge control agent should be a quantity that is effective in generating a charge, and is typically within a range from about 0.1 to about 5% by weight of the toner solid fraction. Examples of suitable charge control agents include charge control agents such as alkylpyridinium halides, bisulfates, and silica, as well as negative charge control agents such as aluminum complexes, although the present invention is not restricted to these materials.

Examples of other additives that can be added as required include inorganic particles, which may be added in a wet state. Specific examples of suitable inorganic particles that can be added in a wet state include all of the materials typically used as external additives for toner surfaces, including silica, alumina, titania, calcium carbonate, magnesium carbonate, and tricalcium phosphate. These materials can be dispersed in water using an ionic surfactant, a polymer acid, or a polymer base, and then added in a wet state, for example as a inorganic particle dispersion of silica or the like.

The particle size of the silica within a dispersion used in the present embodiment refers to the volume average particle size measured using the above laser diffraction type particle size distribution analyzer (Microtrac, manufactured by NIKKISO Co., Ltd.), and is typically within a range from about 4 nm to about 150 nm.

Various emulsion dispersions, pigment dispersions, release agent dispersions, silica dispersions, inorganic particle dispersions, toner dispersions, and wastewaters produced by apparatus cleaning, each of which contains a solid fraction that includes surfactants, colorants, release agents, inorganic particles, silica, and/or toner or the like, are discharged during the aforementioned production processes (including the toner washing step) for latex polymer production, colorant dispersion production, release agent dispersion production, or toner production, either having been deemed unnecessary during certain production steps, or having been generated during maintenance of the production facilities.

Amongst these different wastewaters, the silica dispersion discharged from the aforementioned washing step accounts for approximately 1% of the total volume of wastewater. These different wastewaters are collected in the untreated water tank and then treated using the wastewater treatment process described above.

The wastewater treatment process according to this embodiment of the present invention is preferably applied to the treatment of wastewater containing a solid fraction that has been discharged during a process for producing electrophotographic toner by a chemical toner production method such as an emulsion polymerization method.

In the above description of the embodiment of the present invention, a production process for electrophotographic toner was presented as an example, but the wastewater treatment process according to this embodiment can also be applied to the treatment of wastewater containing surfactants or silica that has been discharged from a production process at a production plant for water-based dispersions such as water-based paint.

EXAMPLES

As follows is a more detailed description of the present invention based on a series of examples and comparative examples, although the scope of the present invention is in no way limited to the following examples.

<Electrophotographic Toner Production Example>

As follows is a description of a sample electrophotographic toner production, from which is discharged the wastewater that is subjected to the wastewater treatment of the examples and comparative examples.

[Preparation of Emulsion Dispersion]

| styrene | 320 parts by weight |
| n-butyl acrylate | 80 parts by weight |
| acrylic acid | 10 parts by weight |
| dodecanethiol | 10 parts by weight |

420 parts of this solution, and a solution comprising 6 parts by weight of a non-ionic surfactant (Nonipol 400, manufactured by Sanyo Chemical Industries, Ltd.) and 10 parts by weight of an anionic surfactant (Neogen R, manufactured by Dai-ichi Kogyo Seiyaku Co., Ltd.) dissolved in 550 parts by weight of ion exchange water were placed in a flask, and then dispersed and emulsified. With the emulsion undergoing gentle stirring, a solution of 4 parts by weight of ammonium persulfate dissolved in 50 parts by weight of ion exchange water was then added over a period of 10 minutes. Subsequently, the inside of the flask was flushed thoroughly with nitrogen, and with the mixture undergoing constant stirring, the system temperature was raised to 70° C. using an oil bath. This temperature was then maintained for 5 hours to allow the emulsion polymerization to proceed, thereby yielding an emulsion dispersion.

When the latex polymer obtained as this emulsion dispersion was measured with a laser diffraction type particle size distribution analyzer (Microtrac, manufactured by NIKKISO Co., Ltd.) to ascertain the volume average particle size (D50) of the resin particles, the result was 155 nm. Measurement of the resin glass transition temperature using a differential scanning calorimeter (DSC-50, manufactured by Shimadzu Corporation) with a rate of temperature increase of 10° C./minute revealed a value of 54° C., and measurement of the weight average molecular weight (the polystyrene equivalent value) using a molecular weight analyzer (HLC-8020, manufactured by Tosoh Corporation) and using THF as a solvent produced a result of 33,000.

[Preparation of Colorant Dispersion]

| pigment | 150 parts by weight |
| anionic surfactant (Neogen SC, manufactured by Dai-ichi Kogyo Seiyaku Co., Ltd.) | 20 parts by weight |
| ion exchange water | 400 parts by weight |

The above components were mixed together and then dispersed in an Altimizer, thus yielding a colorant dispersion. The pigments used included a yellow pigment (C.I.Pigment Yellow 74, manufactured by Dainichiseika Color & Chemicals Mfg. Co., Ltd.), a cyan pigment (C.I.Pigment Blue 15:3, manufactured by BASF Corporation), a magenta pigment (C.I.Pigment Red 122, manufactured by Dainichiseika Color & Chemicals Mfg. Co., Ltd.), and a black pigment (carbon black, manufactured by Cabot Corporation).

[Preparation of Release Agent Dispersion]

| paraffin wax (HNP0190, melting point: 85° C., manufactured by Nippon Seiro Co., Ltd.) | 50 parts by weight |
| cationic surfactant (Sanisol B50, manufactured by Kao Corporation) | 5 parts by weight |
| ion exchange water | 200 parts by weight |

The above components were heated to 95° C., dispersed using a homogenizer (Ultra-Turrax T50, manufactured by IKA Japan), and then subjected to further dispersion treatment using a pressure discharge homogenizer, thus yielding a release agent dispersion containing dispersed release agent particles with an average particle size of 550 nm.

[Preparation of Aggregate Particles]

| emulsion dispersion | 200 parts by weight |
| colorant dispersion | 30 parts by weight |
| release agent dispersion | 70 parts by weight |
| cationic surfactant (Sanisol B50, manufactured by Kao Corporation) | 1.5 parts by weight |

The above components were mixed together and dispersed in a stainless steel round-bottom flask using a homogenizer (Ultra-Turrax T50, manufactured by IKA Japan), and with the dispersion undergoing constant stirring, the temperature inside the flask was raised to 48° C. using a heated oil bath. This raised temperature of 48° C. was maintained for 30 minutes, and subsequent inspection of the dispersion under an optical microscope confirmed that aggregate particles (volume: 95 $cm^3$) with an average particle size of approximately 5 μm had formed.

[Preparation of Attached Particles]

60 parts by weight of the resin particle dispersion described above was added slowly to the aggregate particle dispersion prepared above. The volume of resin particles within the resin particle dispersion was 25 $cm^3$. The temperature of the heated oil bath was then raised to 50° C., and held at that temperature for one hour. Subsequent inspection under an optical microscope confirmed that attached particles with an average particle size of approximately 5.7 μm had formed.

Subsequently, to this attached particle dispersion was added 3 parts by weight of an anionic surfactant (Neogen SC, manufactured by Dai-ichi Kogyo Seiyaku Co., Ltd.), the stainless steel flask was then sealed, and with constant stirring using a magnetic seal, the temperature was raised to 105° C., and maintained at that temperature for 3 hours. The mixture was then cooled, and the reaction product was filtered off, washed thoroughly with ion exchange water, and dried, yielding an electrophotographic toner.

[Composition of Wastewater A]

Wastewater A refers to wastewater discharged from the production plant used for producing the above electrophotographic toner during the aforementioned washing step, and comprises residues of the pigment dispersion, release agent (wax) dispersion, emulsion dispersion, aqueous surfactant solution, and silica and the like. The main components of the wastewater A are shown below. The wastewater A contained surfactants, latex polymers, colorants, wax, and silica and the like, the solid fraction concentration of the wastewater A was 0.01% by weight, and the chemical oxygen demand was 20 mg/L.

| | |
|---|---|
| surfactants | 0.008 parts by weight |
| latex polymers | 0.004 parts by weight |
| colorants | 0.016 parts by weight |
| wax | 0.012 parts by weight |
| silica | 0.06 parts by weight |
| water | 999.9 parts by weight |

The solid fraction concentration was measured using a method in which a sample of the wastewater was placed inside an aluminum container, and the water component was then evaporated off in an oven. Furthermore, the chemical oxygen demand was measured in accordance with the method prescribed in JIS K 0102 17. Specifically, an oxidizing agent is added to the sample and reacted under specific conditions, and the quantity of oxidizing agent consumed is converted to an equivalent quantity of oxygen.

[Composition of Wastewater B]

Wastewater B also refers to wastewater discharged from the production plant used for producing the above electrophotographic toner during the aforementioned washing step, and although the composition of the wastewater B is similar to that of the wastewater A, their respective concentrations are different. The main components of the wastewater B are shown below. The wastewater B contained surfactants, latex polymers, colorants, release agent (wax), and silica and the like, the solid fraction concentration of the wastewater B was 5% by weight, and the chemical oxygen demand was 1,000 mg/L.

| | |
|---|---|
| surfactants | 4 parts by weight |
| latex polymers | 2 parts by weight |
| colorants | 8 parts by weight |
| wax | 6 parts by weight |
| silica | 30 parts by weight |
| water | 950 parts by weight |

EXAMPLE 1

[Treatment of the Wastewater A]

The wastewater A with a solid fraction concentration of 0.01% by weight discharged from the aforementioned toner production process was treated using the wastewater treatment apparatus shown in FIG. 1. In this example, treatment using a coagulation-sedimentation method is described, but the present invention is not restricted to this method, and a pressure flotation separation method, or a combination of the two methods could also be used. The wastewater A was first collected in the untreated water tank 10, and was then pumped into the reaction tank 12, where the pH of the wastewater was adjusted to a value from 5 to 7 using an acid (hydrochloric acid), 50 mg/L of a polysilicato-iron coagulant (Fe/Si molar ratio=1.0) was added, and a coagulation reaction was conducted under conditions including a stirring speed of 500 rpm and a residence time of 10 minutes. The resulting reaction liquid was then pumped into the coagulation tank 14 (18 m$^3$), and flock formation was conducted using a stirring speed of 300 rpm and a residence time of 10 minutes. Favorable flock formation was achieved. Subsequently, the treatment liquid containing the flock formed within the coagulation tank 14 was pumped into the coagulation-sedimentation tank 16. The transferred treatment liquid was then allowed to undergo natural settling within the coagulation-sedimentation tank 16, causing a separation into a sludge slurry containing the concentrated flock and a separated liquid. The time required for this separation was one hour. The separated liquid that separated from the sludge slurry within the coagulation-sedimentation tank 16 was pumped into the biological treatment tank 18 and subjected to biological treatment (activated sludge treatment), and in the subsequent secondary sedimentation tank 20, natural settling was used to separate the treatment liquid into an activated sludge and supernatant water. The supernatant water obtained in the secondary sedimentation tank 20 was then filtered by passage through the sand filtration device 22 and the activated carbon filtration-adsorption device 24. The chemical oxygen demand of the resulting discharge water was <5 mg/L. Furthermore, the sludge slurry that separated from the liquid within the coagulation-sedimentation tank 16, together with the sludge slurry obtained in the secondary sedimentation tank 20, was subjected to concentrating in the sludge concentration tank 26 and to dewatering treatment in the dewatering device 28 (a filter press), and was recovered as sludge. A total of 18 m$^3$ of the wastewater A was treated, the treated wastewater was colorless and transparent, and the final quantity of sludge generated was 0.15 g/L.

COMPARATIVE EXAMPLE 1

The wastewater A with a solid fraction concentration of 0.01% by weight discharged from the aforementioned toner production process was treated using the wastewater treatment apparatus shown in FIG. 2. The wastewater A was first collected in the untreated water tank 10, and was then pumped into the reaction tank 12, where the pH of the wastewater was adjusted to a value from 6 to 7 using an acid (hydrochloric acid), 5,000 mg/L of an inorganic coagulant (an aqueous solution of ferric chloride) was added, and a coagulation reaction was conducted under conditions including a stirring speed of 500 rpm and a residence time of 10 minutes. The resulting reaction liquid was then pumped into the coagulation tank 14, 1 mg/L of a polymer coagulant (Hymolock SS-100, an acrylamide-based polymer coagulant, manufactured by Hymo Co., Ltd.) was added, and flock formation was conducted using a stirring speed of 300 rpm and a residence time of 10 minutes. Favorable flock formation was achieved. Subsequently, the treatment liquid containing the formed flock was pumped into the coagulation-sedimentation tank 16. The transferred treatment liquid was then allowed to undergo natural settling within the coagulation-sedimentation tank 16, causing a separation into a sludge slurry containing the concentrated flock and a separated liquid. The time required for this separation was one hour. The separated liquid that separated from the sludge slurry within the coagulation-sedimentation tank 16 was pumped into the biological treatment tank 18 and subjected to biological treatment (activated sludge treatment), and in the subsequent secondary sedimentation tank 20, natural settling was used to separate the treatment liquid into an activated sludge and supernatant water. The supernatant water obtained in the secondary sedimentation tank 20 was then filtered by passage through the sand filtration device 22 and the activated carbon filtration-adsorption device 24. The chemical oxygen demand of the resulting discharge water was <5 mg/L. Furthermore, the sludge slurry that separated from the liquid within the coagulation-sedimentation tank 16, together with the sludge slurry obtained in the secondary sedimentation tank 20, was subjected to concentrating in the sludge concentration tank 26 and dewatering treatment in the dewatering device 28 (a filter press), and was recovered as sludge. A total of 18 m³ of the wastewater A was treated, and the final quantity of sludge generated was 5.1 g/L.

EXAMPLE 2

[Treatment of the Wastewater B]

The wastewater B with a solid fraction concentration of 5% by weight discharged from the aforementioned toner production process was treated using the wastewater treatment apparatus shown in FIG. 1. The wastewater B was first collected in the untreated water tank 10, and was then pumped into the reaction tank 12, where the pH of the wastewater was adjusted to a value from 5 to 7 using an acid (hydrochloric acid), 100 mg/L of a polysilicato-iron coagulant (Fe/Si molar ratio=1.0) was added, and a coagulation reaction was conducted under conditions including a stirring speed of 500 rpm and a residence time of 10 minutes. The resulting reaction liquid was then pumped into the coagulation tank 14, and flock formation was conducted using a stirring speed of 300 rpm and a residence time of 10 minutes. Favorable flock formation was achieved. Subsequently, the treatment liquid containing the flock formed within the coagulation tank 14 was pumped into the coagulation-sedimentation tank 16. The transferred treatment liquid was then allowed to undergo natural settling within the coagulation-sedimentation tank 16, causing a separation into a sludge slurry containing the concentrated flock and a separated liquid. The time required for this separation was one hour. The separated liquid that separated from the sludge slurry within the coagulation-sedimentation tank 16 was pumped into the biological treatment tank 18 and subjected to biological treatment (activated sludge treatment), and in the subsequent secondary sedimentation tank 20, natural settling was used to separate the treatment liquid into an activated sludge and supernatant water. The supernatant water obtained in the secondary sedimentation tank 20 was then filtered by passage through the sand filtration device 22 and the activated carbon filtration-adsorption device 24. The chemical oxygen demand of the resulting discharge water was <5 mg/L. Furthermore, the sludge slurry that separated from the liquid within the coagulation-sedimentation tank 16, together with the sludge slurry obtained in the secondary sedimentation tank 20, was subjected to concentrating in the sludge concentration tank 26 and to dewatering treatment in the dewatering device 28 (a filter press), and was recovered as sludge. A total of 18 m³ of the wastewater B was treated, the treated wastewater was colorless and transparent, and the final quantity of sludge generated was 50.1 g/L.

COMPARATIVE EXAMPLE 2

The wastewater B with a solid fraction concentration of 5% by weight discharged from the aforementioned toner production process was treated using the wastewater treatment apparatus shown in FIG. 2. The wastewater B was first collected in the untreated water tank 10, and was then pumped into the reaction tank 12, where the pH of the wastewater was adjusted to a value from 6 to 7 using an acid (hydrochloric acid), 5,000 mg/L of an inorganic coagulant (an aqueous solution of ferric chloride) was added, and a coagulation reaction was conducted under conditions including a stirring speed of 500 rpm and a residence time of 10 minutes. The resulting reaction liquid was then pumped into the coagulation tank 14, 2 mg/L of a polymer coagulant (Hymolock SS-100, an acrylamide-based polymer coagulant, manufactured by Hymo Co., Ltd.) was added, and flock formation was conducted using a stirring speed of 300 rpm and a residence time of 10 minutes. Favorable flock formation was achieved. Subsequently, the treatment liquid containing the formed flock was pumped into the coagulation-sedimentation tank 16. The transferred treatment liquid was then allowed to undergo natural settling within the coagulation-sedimentation tank 16, causing a separation into a sludge slurry containing the concentrated flock and a separated liquid. The time required for this separation was one hour. The separated liquid that separated from the sludge slurry within the coagulation-sedimentation tank 16 was pumped into the biological treatment tank 18 and subjected to biological treatment (activated sludge treatment), and in the subsequent secondary sedimentation tank 20, natural settling was used to separate the treatment liquid into an activated sludge and supernatant water. The supernatant water obtained in the secondary sedimentation tank 20 was then filtered by passage through the sand filtration device 22 and the activated carbon filtration-adsorption device 24. The chemical oxygen demand of the resulting discharge water was <5 mg/L. Furthermore, the sludge slurry that separated from the liquid within the coagulation-sedimentation tank 16, together with the sludge slurry obtained in the secondary sedimentation tank 20, was subjected to concentrating in the sludge concentration tank 26 and to dewatering treatment in the dewatering device 28 (a filter press), and was recovered as sludge. A total of 18 m³ of the wastewater B was treated, and the treated wastewater exhibited residual coloring from pigments and the like. The final quantity of sludge generated was 185 g/L.

TABLE 1

| | Wastewater | Coagulant | Total quantity of coagulant used [mg/L] | Quantity of sludge generated [g/L] | Chemical oxygen demand [mg/L] |
|---|---|---|---|---|---|
| Example 1 | A | polysilicato-iron | 50 | 0.15 | <5 |
| Example 2 | B | polysilicato-iron | 100 | 50.1 | <5 |
| Comparative example 1 | A | ferric chloride + polymer coagulant | 5,000 | 5.1 | <5 |

TABLE 1-continued

| | Wastewater | Coagulant | Total quantity of coagulant used [mg/L] | Quantity of sludge generated [g/L] | Chemical oxygen demand [mg/L] |
|---|---|---|---|---|---|
| Comparative example 2 | B | ferric chloride + polymer coagulant | 5,000 | 185 | <5 |

As is evident from Table 1, the examples 1 and 2 that used a polysilicato-iron coagulant enabled treatment to be conducted more efficiently than the comparative examples 1 and 2 that used a ferric chloride coagulant. Moreover, the quantity of coagulant used was reduced to approximately 1/100, and the quantity of sludge generated was reduced to approximately 1/30 for the wastewater A, and similarly for the wastewater B, the quantity of coagulant used was reduced to approximately 1/50, and the quantity of sludge generated was reduced to approximately 1/3.

The entire disclosure of Japanese Patent Application No. 2005-177361 filed on Jun. 17, 2005 including specification, claims, drawings and abstract is incorporated herein by reference in its entirety.

What is claimed is:

1. A wastewater treatment process for treating wastewater discharged during a process for producing an electrophotographic toner comprising a water-based dispersion containing a surfactant, a colorant, silica and other solid matter, the process comprising:
   a reaction step of adding a coagulant to the wastewater and conducting a coagulation reaction;
   a flock formation step of forming a flock from aggregates generated in the coagulation reaction of the reaction step; and
   a separation step of separating the flock and a separated liquid;
   wherein:
   the wastewater is treated using a polysilicato-iron coagulant;
   a quantity of the polysilicato-iron coagulant added is equivalent to a concentration within a range from about 1 mg/L to about 500 mg/L relative to the wastewater;
   a temperature of the wastewater during the reaction step is from about 10° C. to about 30° C.;
   the quantity of the surfactant in the wastewater is within a range from about 0.1 to about 4 weight percent of the weight of the wastewater; and
   the quantity of silica in the wastewater is within a range from about 0.1 to about 4 weight percent of the weight of the wastewater.

2. The wastewater treatment process according to claim 1, wherein a Si/Fe molar ratio within the polysilicato-iron coagulant is within a range from about 0.1 to about 4.0.

3. The wastewater treatment process according to claim 1, wherein a pH of a reaction liquid during wastewater treatment using the polysilicato-iron coagulant is within a range from about 4 to about 9.

4. The wastewater treatment process according to claim 1, wherein treatment of the wastewater is conducted using the polysilicato-iron coagulant and an inorganic coagulant.

5. The wastewater treatment process according to claim 4, wherein the inorganic coagulant is at least one of aluminum polychloride and ferric chloride.

6. The wastewater treatment process according to claim 4, wherein a quantity added of the inorganic coagulant is equivalent to a concentration within a range from about 500 mg/L to about 5,000 mg/L relative to the wastewater.

7. The wastewater treatment process according to claim 1, wherein treatment of the wastewater is conducted using the polysilicato-iron coagulant and an organic coagulant.

8. The wastewater treatment process according to claim 7, wherein a quantity added of the organic coagulant is equivalent to a concentration within a range from about 1 mg/L to about 500 mg/L relative to the wastewater.

9. The wastewater treatment process according to claim 1, wherein in the separation step, at least one of a coagulation-sedimentation treatment and a pressure flotation treatment is conducted.

10. A wastewater treatment process for treating wastewater discharged during a process for producing an electrophotographic toner comprising a water-based dispersion containing a surfactant, a colorant, silica and other solid matter, the process comprising:
   a reaction step of adding a coagulant to the wastewater and conducting a coagulation reaction;
   a flock formation step of forming a flock from aggregates generated in the coagulation reaction of the reaction step; and
   a separation step of separating the flock and a separated liquid,
   wherein:
   the other solid matter comprises electrostatic latent image developing toner;
   the wastewater is treated using a polysilicato-iron coagulant;
   a quantity of the polysilicato-iron coagulant added is equivalent to a concentration within a range from about 1 mg/L to about 500 mg/L relative to the wastewater;
   a temperature of the wastewater during the reaction step is from about 10° C. to about 30° C.;
   the quantity of the surfactant in the wastewater is within a range from about 0.1 to about 4 weight percent of the weight of the wastewater; and
   the quantity of silica in the wastewater is within a range from about 0.1 to about 4 weight percent of the weight of the wastewater.

* * * * *